(12) United States Patent
Ho

(10) Patent No.: US 7,242,646 B2
(45) Date of Patent: Jul. 10, 2007

(54) TRACK LOCKING METHOD FOR OPTICAL DISK DRIVE AND APPARATUS

(75) Inventor: Hsu-Feng Ho, Taipei (TW)

(73) Assignee: Mediatek Inc. (TW)

( * ) Notice: Subject to any disclaimer, the term of this patent is extended or adjusted under 35 U.S.C. 154(b) by 330 days.

(21) Appl. No.: 10/710,952

(22) Filed: Aug. 13, 2004

(65) Prior Publication Data
US 2005/0135205 A1  Jun. 23, 2005

(30) Foreign Application Priority Data
Dec. 17, 2003  (TW) ............... 92135848 A

(51) Int. Cl.
*G11B 7/00* (2006.01)
(52) U.S. Cl. .............. 369/44.29; 369/44.34; 369/44.35; 369/44.25
(58) Field of Classification Search ............ 369/44.29, 369/44.34, 44.35
See application file for complete search history.

(56) References Cited

U.S. PATENT DOCUMENTS 5,025,434 A * 6/1991 Tateishi et al. .......... 369/44.29
5,719,836 A * 2/1998 Lewis ...................... 369/44.28
6,236,032 B1 * 5/2001 Kamiyama ............... 250/201.5
6,317,393 B1 * 11/2001 Lewis ...................... 369/44.28
6,992,955 B2 * 1/2006 Ono ......................... 369/44.35
7,085,204 B1 * 8/2006 Park et al. ................ 369/44.34

FOREIGN PATENT DOCUMENTS

| JP | 06-68505 | 3/1994 |
| JP | 10-91971 | 4/1998 |
| TW | 509913 | 11/2002 |

* cited by examiner

*Primary Examiner*—Thang V. Tran
(74) *Attorney, Agent, or Firm*—Connolly Bove Lodge & Hutz, LLP

(57) ABSTRACT

A track locking method and an apparatus thereof enable an optical disk drive to rapidly and stably read data recorded on a target track from a seeking mode to a track locking mode. An optical pick-up head can switch from the on-track interval of a target track to an adjoining off track period only if the tracking servo control system memorizes the last-minute level of the tracking servo output signal of the on-track interval and keeps the tracking servo output signal at the level, so as to generate a pulling force whereby the optical pick-up head is moved back to the on-track interval from the off-track interval.

11 Claims, 6 Drawing Sheets

TRACK LOCKING METHOD FOR OPTICAL DISK DRIVE AND APPARATUS

BACKGROUND OF THE INVENTION

1. Field of the Invention

The present invention relates to a track locking method for an optical disk drive and an apparatus thereof and more particularly to a method for optical disk drives to execute tracking control through holding the level of a tracking servo output (TRO) signal.

2. Description of the Related Art

In the design of the control chip for an optical disk drive, the track locking control of the pickup head of the optical disk drive is a very important control mechanism. Regardless of the manners of so-called static tracking-on or the track locking process after seeking, they all directly affect the data accessing speed and quality of the optical disk drive.

FIG. 1 is a schematic assembly diagram of the movement elements of a conventional optical disk drive. In FIG. 1, an optical disk 80 has its rotation speed controlled by a spindle motor 11, and on a moving platform 13 seeking motions of an optical pick-up head 12 take place in the radial direction of the optical disk 80 using a sledge motor 14. The sledge motor 14 receives a sledge motor control signal FMO as its driving signal. The optical pick-up head 12 is driven by a tracking servo output signal in order to perform tracking control, or, in other words, moving the laser spot for data access from an adjoining track into the groove 81 of a target track.

In general, during the process of seeking and track locking performed on an optical disk, a track error (TE) signal and an RF ripple (RFRP) signal are two sine waveforms or triangular waveforms with approximately 90° phase differences between each other. As shown in FIG. 2, a digitized TE Zero Cross (TEZC) signal can be figured out if the slice level of the track error signal is treated as a threshold, and similarly digitized RF ripple Zero Cross (RFZC) signal can be figured out if the slice level of the RF ripple is treated as a threshold. An optical disk drive calculates the number of tracks to be sought by the optical pick-up head 12, using the TEZC signal and the RFZC signal. In FIG. 2, the waveforms of the TEZC signal and the RFZC signal between $t_1$ and $t_3$ on the time axis are in response to the relative position of the optical pick-up head 12 inside a groove during an on-track interval, whereas the segments of the waveform that flank the on-track interval are separately on two off-track intervals.

Patent No. 509,913 of the Republic of China discloses a track locking method for an optical disk drive, wherein the track locking control is executed in the following way: a track error signal is held or reshaped at its peak instead of the initial track error signal with a sine wave locus when the optical pick-up head just enters an off-track interval from an on-track interval; thus the optical pick-up head of the optical disk drive can rapidly get to its target track. However, such a holding or reshaping method has a drawback, that is, if the optical disk drive runs at a high rotation speed (greater than 5000 rpm) or a considerable eccentricity (greater than 70 µm) exists, the required number of followed tracks increases and the tracking duration becomes longer, and in consequence the performance of the servo control system of the optical disk drive is unsatisfactory.

SUMMARY OF THE INVENTION

The primary objective of the present invention is to provide a track locking method for an optical disk drive and an apparatus thereof, whereby, after the optical pick-up head of an optical disk drive switches from an on-track interval of a target track that currently accommodates the optical pick-up head to an adjoining off-track interval, the last-minute level of a tracking servo output signal in the on-track interval remains unchanged, so as to enable the servo control system to return to the target track faster and read its stored data.

The secondary objective of the present invention is to provide a robust control method for an optical disk drive to get to a target track. After an optical pick-up head gets past the on-track interval of the target track or even goes through half the interval of an adjoining off track period, the optical pick-up head can temporarily switch to the next adjoining track to make the latter the intended target track to be locked, so as to switch back to the initial target track by means of short-seeking once again. As a result, the servo system gets stable sooner.

In order to achieve the above-mentioned objectives, the present invention discloses a track locking method for an optical disk drive and an apparatus thereof, wherein an optical pick-up head can switch from an on-track interval of a current target track to an adjoining off track period only if the tracking servo control system memorizes the last-minute level of the tracking servo output signal of the on-track interval and keeps the tracking servo output signal at the level, so as to generate a pulling force whereby the optical pick-up head is moved back to the on-track interval from the off-track interval.

Once the optical pick-up head gets past the on-track interval of the target track or even goes through half an adjoining off-track interval, the optical pick-up head temporarily switches to the next adjoining on-track interval to make the latter its intended target track, so as to switch back to the initial target track by means of short-seeking once again.

BRIEF DESCRIPTION OF THE DRAWINGS

The invention will be described according to the appended drawings in which.

PREFERRED EMBODIMENT OF THE PRESENT INVENTION

Figure 1:
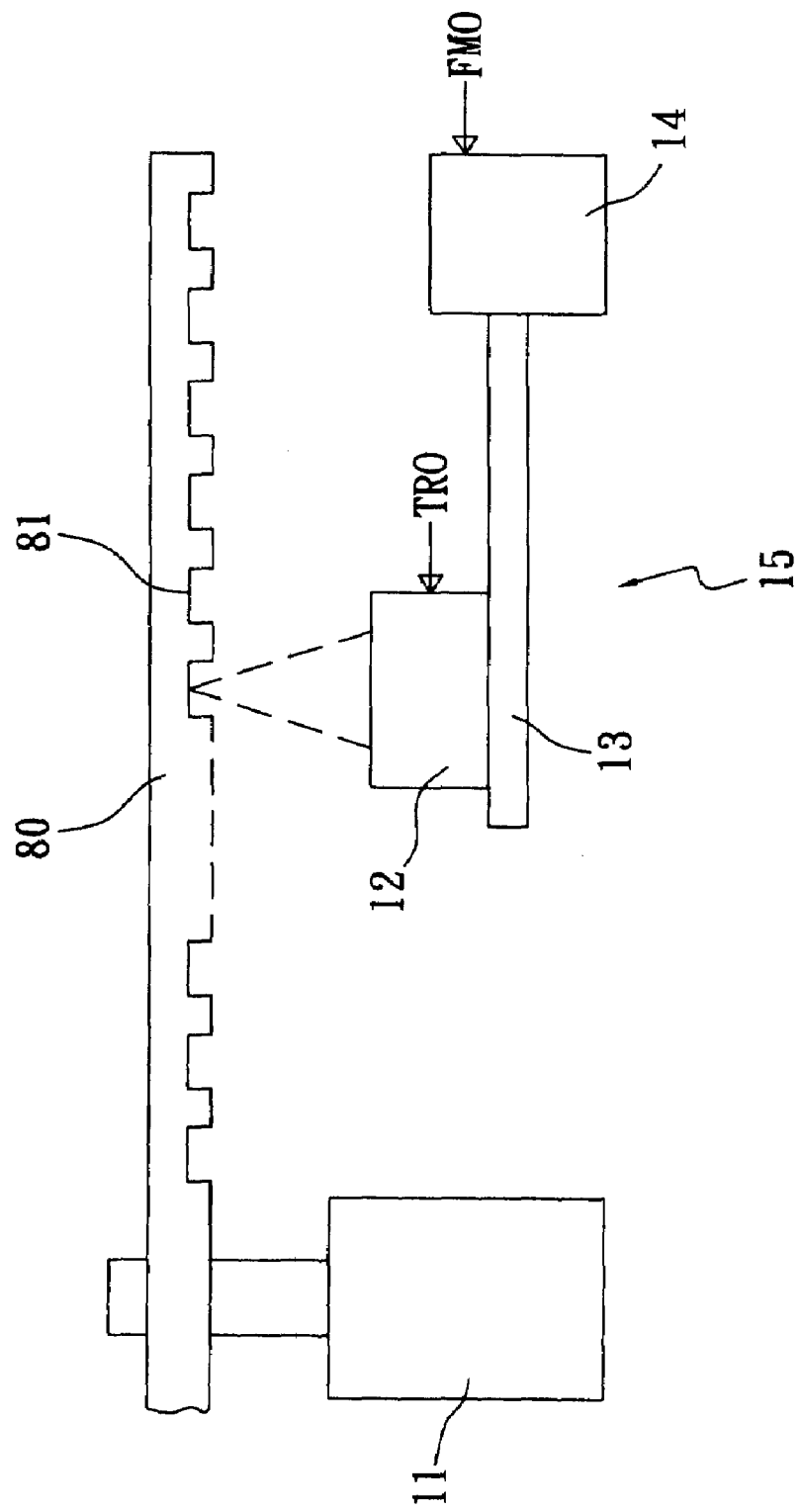
FIG. 1 is a schematic assembly diagram of the movement elements of a conventional optical disk drive.
Figure 2:
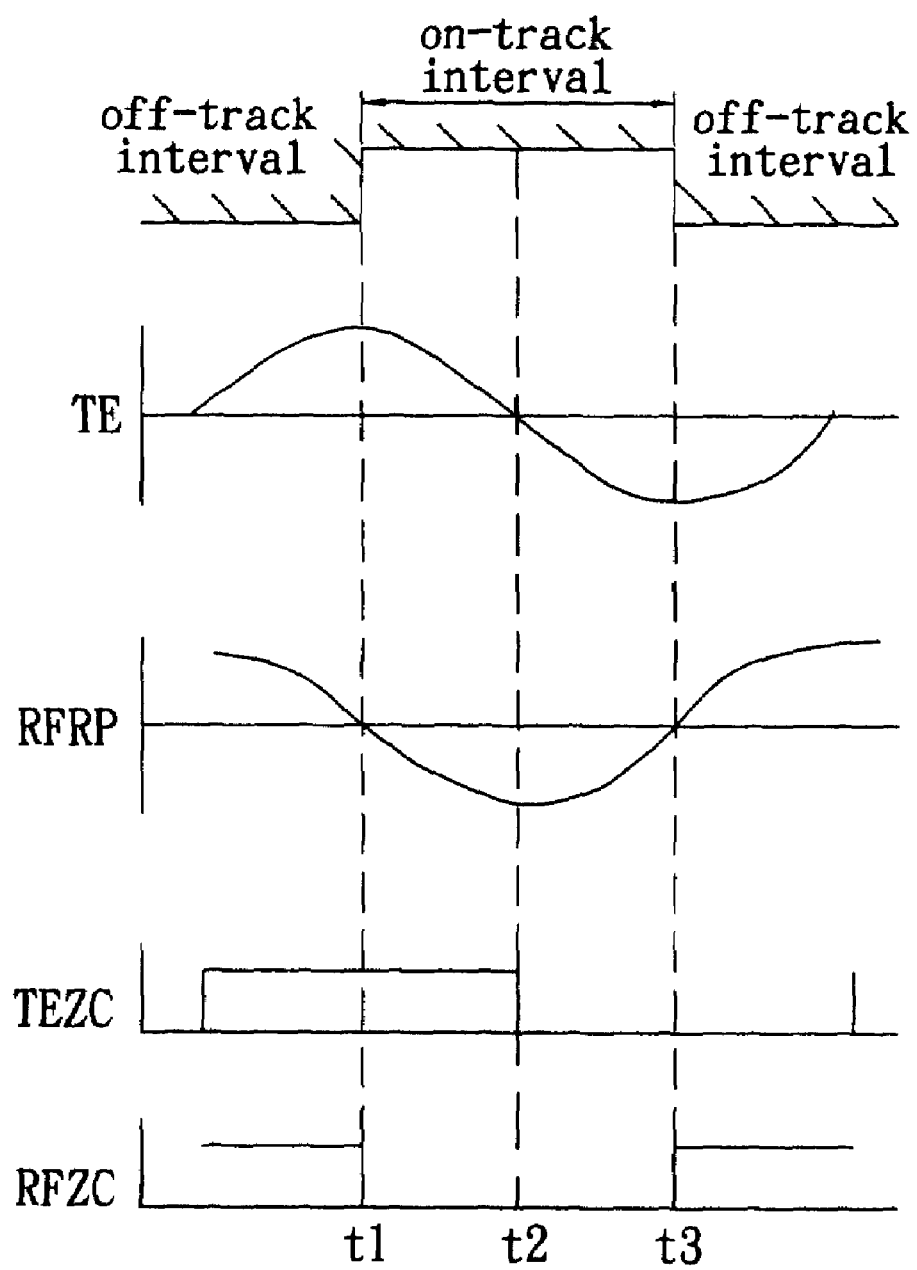
FIG. 2 is a conventional waveform diagram of a track error signal and an RFZC signal.
Figure 3:
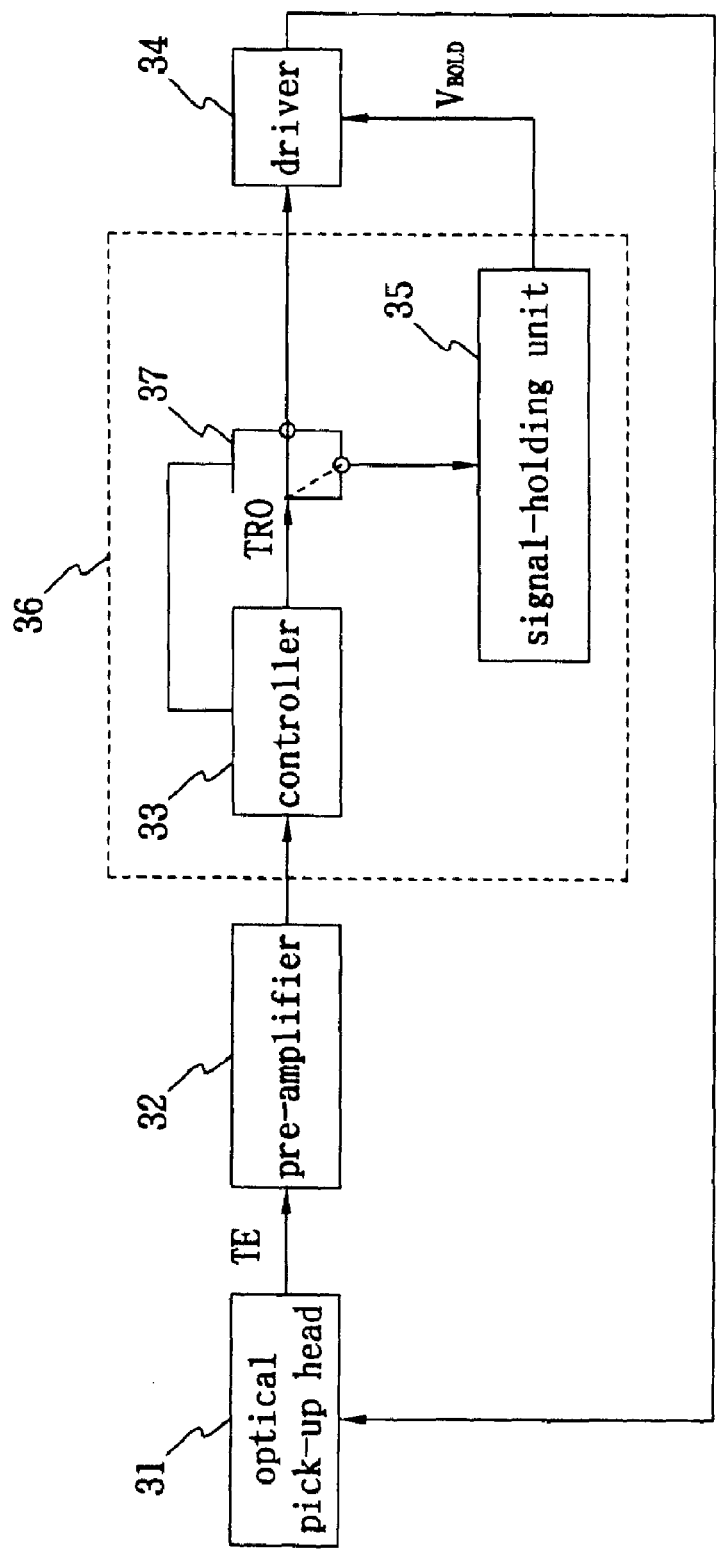
FIG. 3 is a functional block diagram of an optical disk drive in accordance with the present invention.

FIG. 3 is a functional block diagram of an optical disk drive in accordance with the present invention. An optical pick-up head 31 intended to read data stored on optical disks generates a track error signal that functions as the input signal of the servo control system. Signal synthesis and amplification are carried out to the track error signal by a pre-amplifier 32 before the track error signal is input to a track locking apparatus 36 of the optical disk drive. The track locking apparatus 36 comprises a controller 33, a signal-holding unit 35, and a switch 37. The controller 33 generates the tracking servo output signal and sends it to the switch 37. The switch 37, which is under the control of the controller 33, determines whether the tracking servo output signal should be sent to the signal-holding unit 35 or a driver 34. The driver 34 receives the tracking servo output signal from the controller 33 when the optical pick-up head 31 is located at the on-track interval of a target track. The driver 34 receives a signal from the signal-holding unit 35 after the optical pick-up head 31 has shifted to the off-track interval adjoining to the target track. Afterward, the driver 34 outputs a driving signal as a feedback to the optical pick-up head 31 for the sake of track locking, or, in other words, making the optical pick-up head 31 stop at the on-track interval of the target track.

If the optical pick-up head 31 shifts from the on-track interval of the target track to the adjoining off-track interval, the signal-holding unit 35 memorizes the last-minute level $V_{HOLD}$ of the tracking servo output signal before departure from the on-track interval and holds the tracking servo output signal to the memorized level $V_{HOLD}$. According to the present invention, with a pulse width modulation (PWM) method, it is also feasible to generate an output signal at the level $V_{HOLD}$ and intermittently hold the level $V_{HOLD}$ within a duty cycle.

In addition, both the function of the switch 37 and that of the signal-holding unit 35 can be integrated into the controller 33. That is, the controller 33 can independently determine when the servo control system as a closed loop generates the tracking servo output signal and when as an open loop to apply the memorized level $V_{HOLD}$ to the driver 37.

Figure 4:
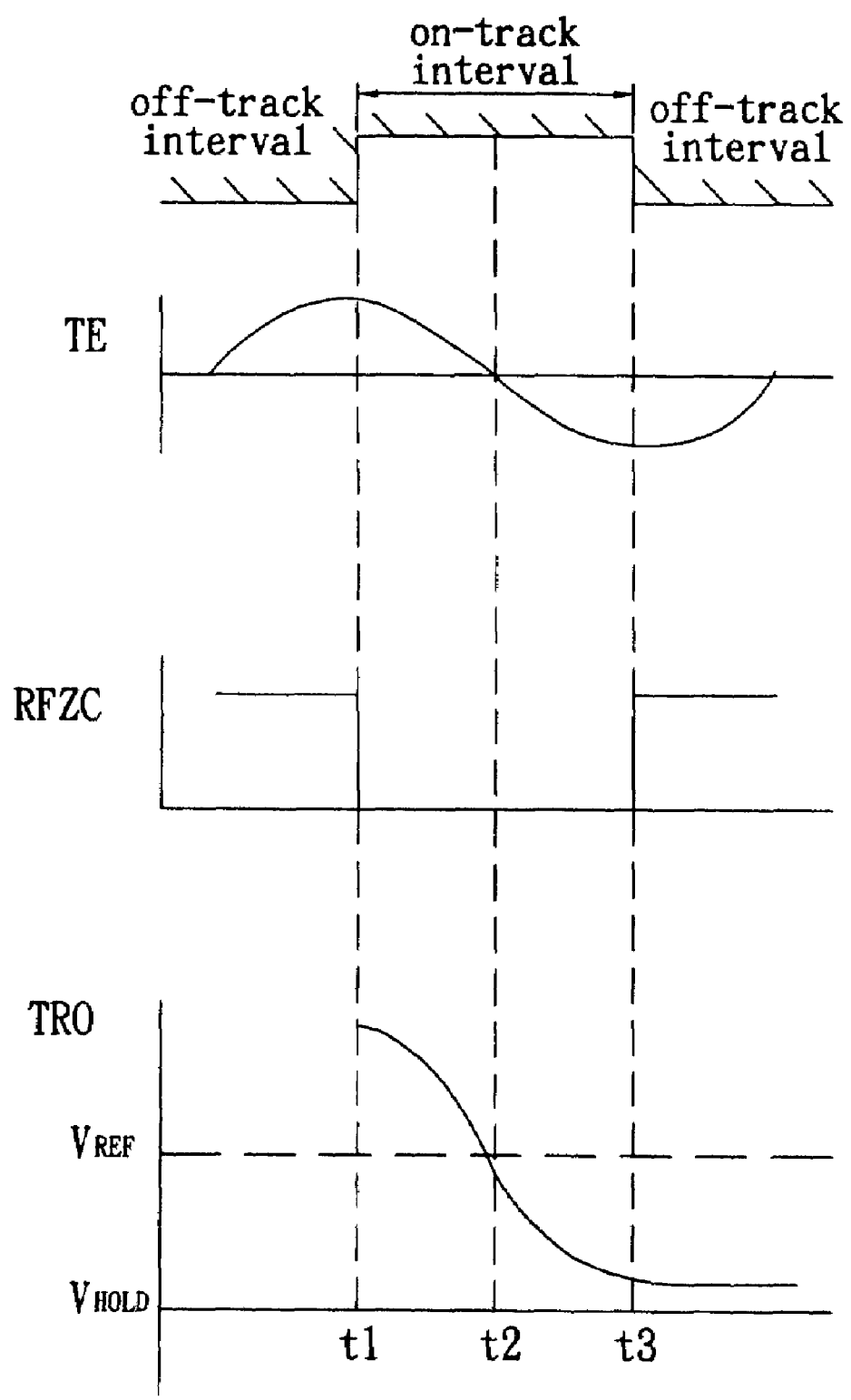
FIG. 4 is a waveform diagram of a tracking servo output signal in accordance with the present invention.

FIG. 4 is a waveform diagram of a tracking servo output signal in accordance with the present invention. Once the optical pick-up head 31 reaches the on-track interval ($t_1$–$t_2$) of the target track, the potential of the tracking servo output signal approaches a slice level that functions as a reference potential $V_{REF}$, whereas the optical pick-up head 31 slows down and almost stops at the center of the on-track interval. However, sometimes the optical pick-up head 31 proceeds to move away from the center of the on-track interval, that is, the interval $t_2$–$t_3$ of the transverse axis, and it fails to halt instantaneously due to its mass inertia or any other reason and may even move toward an adjoining off-track interval. Meanwhile, the potential of the tracking servo output signal remains less than the reference potential $V_{REF}$ in order to generate a force to pull the optical pick-up head 31 back to the center of the on-track interval.

Once the optical pick-up head 31 shifts from the on-track interval of the target track to an adjoining off-track interval, the servo control system of the optical disk drive memorizes the last-minute level $V_{HOLD}$ of the tracking servo output signal in the on-track interval and holds the tracking servo output signal to the level $V_{HOLD}$, so as to maintain the same force to pull the optical pick-up head 31 back to the center of the on-track interval.

With conventional technology, the track error signal is reshaped to indirectly control the track locking motion of an optical pick-up head 31 right in an off-track interval, but a reshaped track error signal has to pass a servo control loop and thus its performance depends on the design of the controller 33. By contrast, the present invention involves directly reshaping and using the tracking servo output signal to speed up locking the target track. Hence, the present invention involves directly driving the optical pick-up head 31 to give an instantaneous pull, as opposed to the indirect method of the conventional technology.

Figure 5:
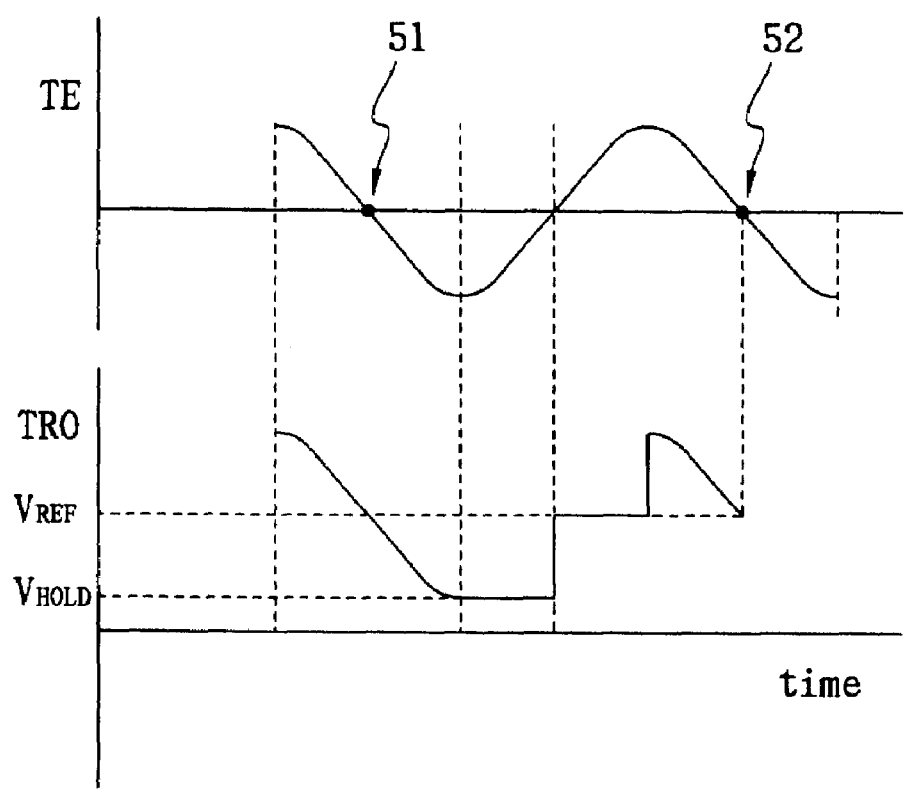
FIG. 5 is another waveform diagram of a tracking servo output signal in accordance with the present invention.

As shown in FIG. 5, after the optical pick-up head 31 gets past the center of an on-track interval 51 of a target track or even goes through half an adjoining off-track interval, the optical pick-up head 31 temporarily switches to the center of the next adjoining on-track interval 52 to make the latter its intended target track, so as to switch back to the initial target track by means of short-seeking once again. As a result, divergence and instability of the servo control system, which may otherwise occur, are avoided by means of an additional short-seeking motion and, in consequence, the target track is locked sooner, though in the beginning the benefits are seemingly achieved at the expense of the precision of the track-locking motions.

Figure 6:
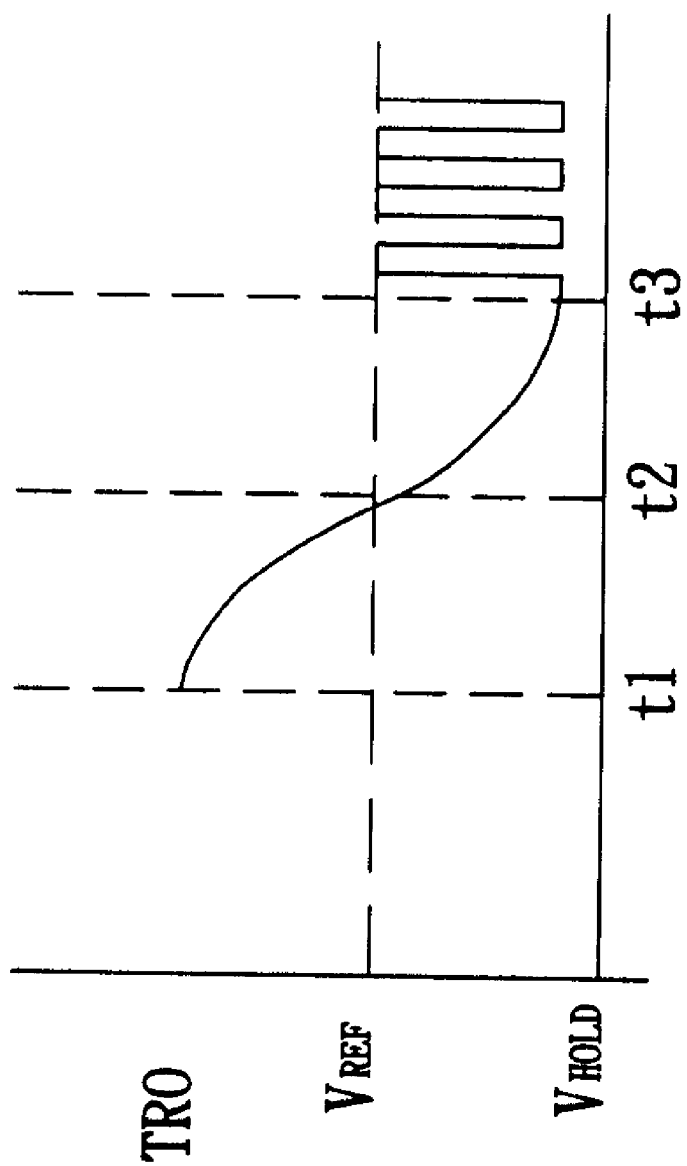
FIG. 6 is a waveform diagram of a tracking servo output signal in accordance with another embodiment of the present invention.

FIG. 6 is a diagram of another embodiment about the waveforms of the tracking servo output signal in accordance with the present invention. In comparison with FIG. 4 showing that the tracking servo output signal is ceaselessly kept to the level $V_{HOLD}$ therein, an output is intermittently generated at the level $V_{HOLD}$ using pulse width modulation method in FIG. 6, or, in other words, the tracking servo output signal alternates between the memorized level $V_{HOLD}$ and the reference level $V_{REF}$. In the design stage, it is feasible to embed a pulse width modulation circuit in the signal-holding unit 35 shown in FIG. 3, so as to stabilize or smooth the output of the signal-holding unit 35, with a view to applying the present invention to various servo control systems of optical disk drives.

The above-described embodiments of the present invention are intended to be illustrative only. Numerous alternative embodiments may be devised by persons skilled in the art without departing from the scope of the following claims.

The invention claimed is:

1. A track locking method for an optical disk drive, the method comprising:

generating a tracking servo output signal from a track error signal for driving an optical pick-up head to arrive at a target track;

determining an instantaneous level of the tracking servo output signal at the moment that the optical pick-up head was shifting to an adjoining off-track interval from an on-track interval of the target track; and holding the tracking servo output signal at the instantaneous level until the optical pick-up head moves to the on-track interval of the target track.

2. The track locking method for an optical disk drive of claim 1, further comprising the steps of:

temporarily switching the optical pick-up head to an adjoining on-track interval after the optical pick-up head goes through half an off-track interval adjoining to the on-track interval of the target track; and switching the optical pick-up head back to the target track by means of a short-seeking motion.

3. A track locking method for an optical disk drive, the method comprising:

generating a tracking servo output signal from a track error signal for driving an optical pick-up head to arrive at a target track;

determining an instantaneous level of the tracking servo output signal at the moment that the optical pick-up head was shifting to an adjoining off-track interval from an on-track interval of the target track;

intermittently holding the tracking servo output signal at the instantaneous level by using a pulse width modulated signal until the optical pick-up head moves to the on-track interval of the target track.

4. The track locking method for an optical disk drive of claim 3, further comprising the step of:
   temporarily switching the optical pick-up head to an adjoining on-track interval after the optical pick-up head goes through half an off-track interval adjoining to the on-track interval of the target track; and
   switching the optical pick-up head back to the target track by means of a short-seeking motion.

5. A track locking apparatus for an optical disk drive, comprising:
   a controller that generates a tracking servo output (TRO) signal in response to a track error (TE) signal;
   a signal-holding unit that determines and holds a voltage level ($V_{HOLD}$) of the tracking servo output signal during an on-track interval of a target track; and
   a switch configured to connect the tracking servo output signal to the signal-holding unit in response to arrival of an optical pick-up head of the optical disk drive at an adjoining off-track interval from the on-track interval.

6. The track locking apparatus for an optical disk drive of claim 5, further comprising a pulse width modulation circuit operatively connected to the signal holding unit.

7. The track locking apparatus for an optical disk drive of claim 5, wherein the signal-holding unit is embedded in the controller.

8. The track locking apparatus for an optical disk drive of claim 5, wherein the switch directly connects the tracking servo output signal to a driver when the optical pick-up head dwells in the on-track interval of the target track.

9. The track locking apparatus for an optical disk drive of claim 5, wherein the switch is controlled by the controller.

10. The track locking apparatus for an optical disk drive of claim 5, wherein the switch is embedded in the controller.

11. The apparatus of claim 6, wherein the pulse width modulation circuit outputs the tracking servo output signal as a signal that periodically varies between a reference voltage and the voltage level $V_{HOLD}$.

* * * * *